United States Patent [19]
Anderson et al.

[11] 4,144,387
[45] Mar. 13, 1979

[54] PHOSPHONATE FLAME RETARDANT MIXTURE AND RESINOUS FOAMS CONTAINING SAME

[75] Inventors: James J. Anderson, Richmond, Va.; Vasco G. Camacho, Charleston, S.C.; Robert E. Kinney, Lawrenceville, N.J.; Francis M. Seger, Factoryville, Pa.

[73] Assignee: Mobil Oil Corporation, New York, N.Y.

[21] Appl. No.: 874,460

[22] Filed: Feb. 2, 1978

Related U.S. Application Data

[63] Continuation-in-part of Ser. No. 639,750, Dec. 11, 1975, abandoned, which is a continuation-in-part of Ser. No. 483,174, Jun. 26, 1974, abandoned.

[51] Int. Cl.² .......................... C09K 3/28; C08K 5/53; C08G 18/14
[52] U.S. Cl. ..................................... 521/174; 8/116 P; 106/15.05; 252/8.1; 260/45.7 P; 521/108; 521/906
[58] Field of Search .................. 260/2.5 AJ, 45.7 P; 252/8.1; 521/174, 108, 906; 106/15 FP

[56] References Cited

U.S. PATENT DOCUMENTS

| | | | |
|---|---|---|---|
| 3,321,330 | 5/1967 | Mohney | 106/15 FP |
| 3,412,070 | 11/1968 | Jakob et al. | 260/45.7 P |
| 3,772,222 | 11/1973 | Steward et al. | 260/2.5 AJ |
| 4,086,303 | 4/1978 | Weil | 521/108 |

*Primary Examiner*—H.S. Cockeram
*Attorney, Agent, or Firm*—Charles A. Huggett; Hastings S. Trigg

[57] ABSTRACT

There is provided a flame retardant mixture containing between about one weight percent and about 75 weight percent of a compound having the structure:

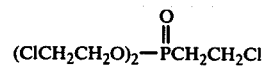

and between about 99 weight percent and about 25 weight percent of a high boiling phosphonate comprising predominantly a compound having the structure:

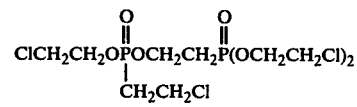

There are also provided polymers, particulary rigid and flexible urethane foams, containing between about two weight percent and about 30 weight percent of the flame retardant mixture.

14 Claims, 3 Drawing Figures

FIGURE 1
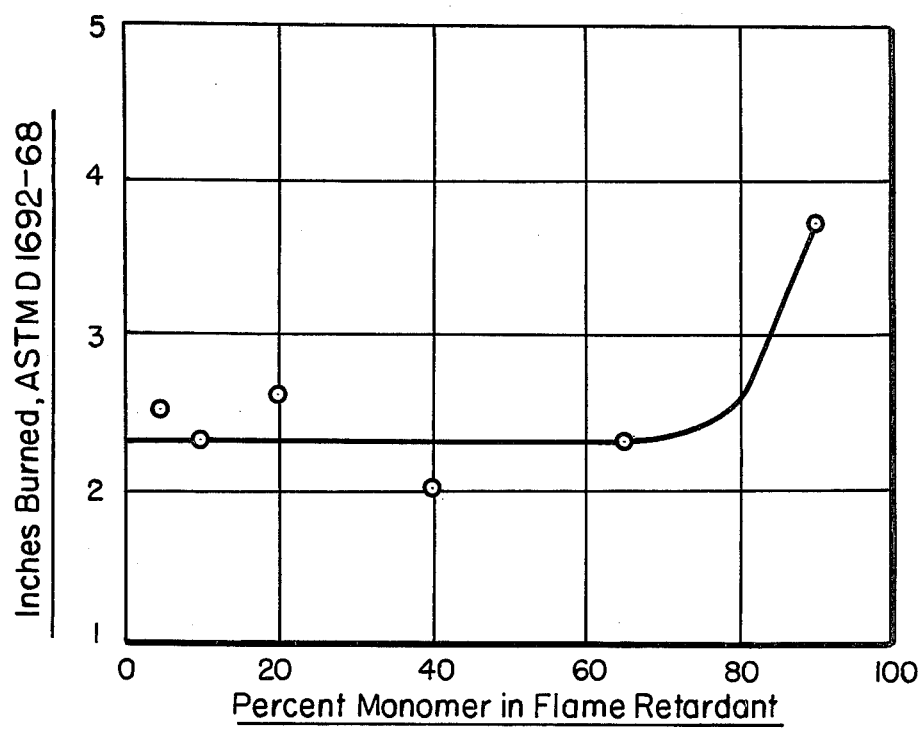
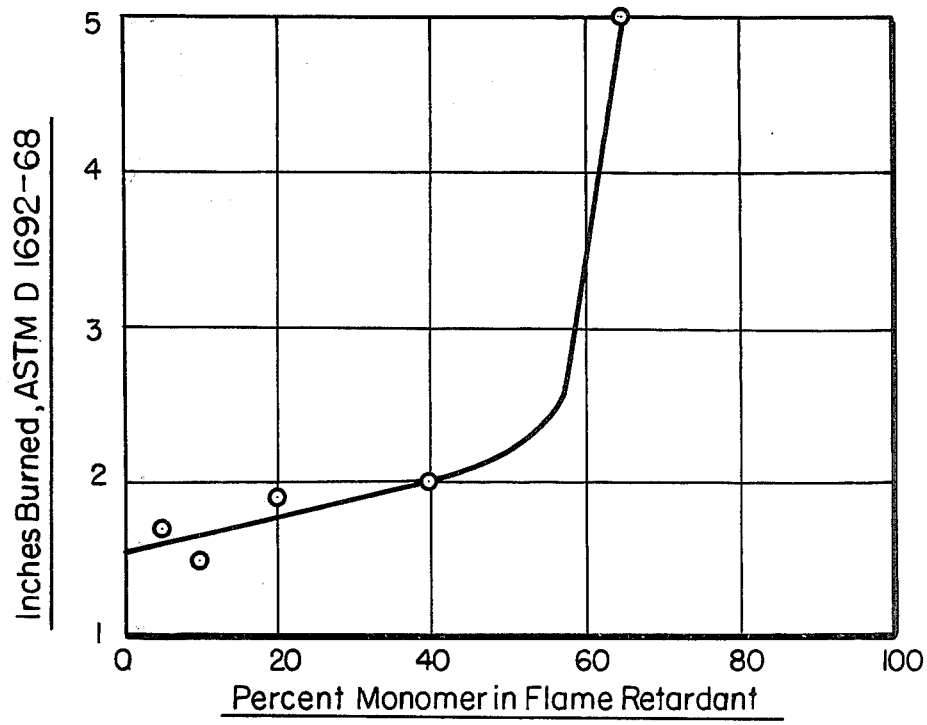
FIGURE 2

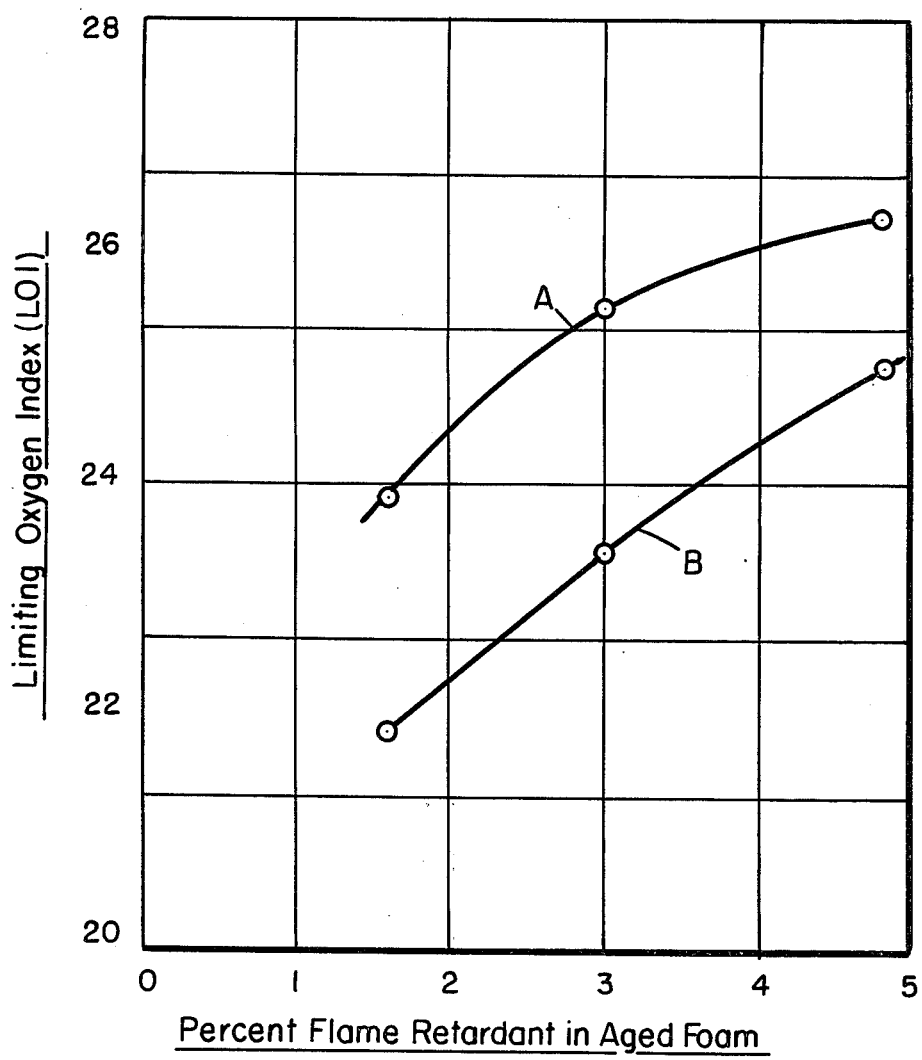

PHOSPHONATE FLAME RETARDANT MIXTURE AND RESINOUS FOAMS CONTAINING SAME

CROSS-REFERENCE TO RELATED APPLICATIONS

This application is a continuation-in-part of copending application Ser. No. 639,750 filed Dec. 11, 1975 now abandoned, which is a continuation-in-part of application Ser. No. 483,174 filed June 26, 1974 and now abandoned.

BACKGROUND OF THE INVENTION

1. Field of the Invention

This invention is concerned with a novel mixture of phosphonate esters. It is also concerned with fire retardant polymer compositions containing them.

2. Description of the Prior Art

In U.S. Pat. No. 3,027,349 there is disclosed a mixed phosphite-phosphonate polymeric material produced by isomerizing tris(2-chloroethyl)phosphite at temperatures greater than 180° C. (180°–300° C.) and their use as flame retardants. The polymeric structures (high boiling phosphonate) of this invention do not have the phosphite structure in the molecule, i.e., all the phosphorus atoms in the compound are pentavalent phosphorus.

SUMMARY OF THE INVENTION

There is provided a flame retardant mixture containing between about one weight percent and about 75 weight percent of a compound having the structure:

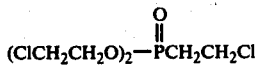

and between about 99 weight percent and about 25 weight percent of a high boiling phosphonate comprising predominantly a compound having the structure:

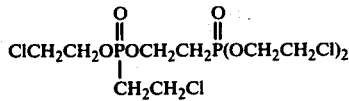

There are also provided polymers, particularly rigid and flexible urethane foams, containing between about two weight percent and about 30 weight percent of the flame retardant mixture.

BRIEF DESCRIPTION OF THE DRAWINGS

In the drawings,

FIG. 1 presents a curve showing the correlation between the percent monomer in the flame retardant mixture and the burning rate for an unaged flexible foam composition;

FIG. 2 presents the same correlation as in FIG. 1 for aged flexible foam compositions;

FIG. 3 presents the correlation between the percent flame retardants in flexible foam and the Limiting Oxygen Index (LOI) found and predicted.

DESCRIPTION OF SPECIFIC EMBODIMENTS

The compositions from which the flame retardant mixtures of this invention are obtained are produced by the thermal isomerization of tris(2-chloroethyl)phosphite (TCEP). The isomerization is carried out by slow addition of the phosphite to a product heel (i.e., a heel of preformed product) at a temperature below 180° C. (about 175° C.).

The product heel generally serves as a diluent and heat transfer means in the isomerization reaction. The initial product heel can be made by adding TCEP to an inert solvent that acts as a diluent and heat transfer means. Thus, an initial product heel was prepared by the addition, in increments, of 450 lbs. of TCEP to 110 lbs. of o-dichlorobenzene at about 175° C. over a period of about 4.5 hours, in a 50 gallon vessel. Then, the o-dichlorobenzene solvent was removed at about 150° C. at about 1–8 mm. mercury pressure (about 3 hrs.). Once the initial product has been obtained, it or a portion of it can be used as the product heel in subsequent runs to isomerize TCEP. This eliminates the need for using an inert diluent (as used in the initial run) and the necessity of the tedious and expensive removal of the diluent from the product. The amount of product heel used as diluent and heat transfer means can vary widely, generally between about 10 percent and about 100 percent based upon the weight of TCEP to be isomerized in a given run. In a typical run, about 480 lbs. of TCEP can be isomerized using about 100 lbs. of product heel to yield 570–580 lbs. of product. About 100 lbs. of that product can be used as product heel in a subsequent run.

The major constituent of the product was about 65 percent, by Vapor Phase Chromatography (VPC), bis(2-chloroethyl) 2-chloroethyl phosphonate having the structure:

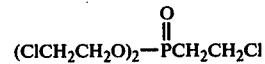

The remainder was high boiling phosphonate which comprises predominantly a compound having the structure:

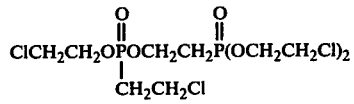

Evidence for this structure includes the presence of a major peak in the VPC analyses with a retention time which was consistent with the structure in the dimer molecular weight range and the absence of significant amounts of titratable P (III) phosphorus in the product. This contrasts with the material described in U.S. Pat. No. 3,027,349 which contains a significant amount of phosphite which is titratable by the standard $I_2$ method. The high boiling phosphonate may also contain small amounts of trimer and higher phosphonates similar to the above structure. This mixture contains about 65 weight percent monomeric phosphonate and, after stripping out low boiling by-products at 15–25 mm mercury at about 150° C., can be used directly as a flame retardant mixture in accordance with this invention. This mixture was also subjected to fractional distillation to separate monomer product from high boiling phosphonate, leaving a high boiling phosphonate containing 1–2 weight percent of residual monomer. These fractions were blended to produce flame retardant mixtures in accordance with this invention containing varying proportions of monomer to high boiling phosphonates.

In order to produce the flame retardant mixtures of this invention the 65% monomer - 35% high boiling phosphonate mixture described hereinbefore can be used as such or mixtures can be prepared by suitable blending of monomer and high boiling phosphonate to produce mixtures in accordance with the invention. Intermediate mixtures can also be prepared by stripping off only part of the monomer. These mixtures will contain between about one weight percent and about 75 weight percent monomer, preferably between about 2 weight percent and about 65 weight percent and between about 99 weight percent and about 25 weight percent high boiling phosphonate, preferably between about 98 weight percent and about 35 weight percent.

EXAMPLES 1-7

Flexible fire-retardant urethane foams were formulated as follows:

Table I

| Ingredients | Parts by Weight |
|---|---|
| Toluene diisocyanate[a] | 42.2 |
| Polyether triol[b] | 100.0 |
| Water | 3.2 |
| Silicone Surfactant[c] | 1.0 |
| Amine Catalyst[d] | 0.3 |
| Stannous Octoate | 0.3 |
| Foaming Agent[e] | 3.0 |
| Flame Retardant agent | 10.0 |

[a]Allied Chemical, Nacconate 80;
[b]Union Carbide LG-56;
[c]Union Carbide Y-6634;
[d]Houdry Dabco 33-J.V;
[e]DuPont R-11

The flame retardant agent was formulated from the monomeric and high boiling phosphonate fractions described above to prepare flame retardants with the desired monomer content. These flame retardants were formulated in flexible urethane foams as indicated above, and tested in ASTM D-1692-68 test (Table II). The samples with <90% monomer content gave essentially equivalent results and were clearly superior to the 90% monomer material (Table II and FIG. 1).

TABLE II[a]

| | Unaged Flexible Foam Tests | | | | | | |
|---|---|---|---|---|---|---|---|
| Example | 1 | 2 | 3 | 4 | 5 | 6 | 7 |
| Percent Monomer in Flame Retardant | (Control)[b] | 90 | 65 | 40 | 20 | 10 | 5 |
| ASTM D-1692-68 Test Total Inches Burned | 5.0[d] | 3.7[c] | 2.3 | 2.0 | 2.6 | 2.3 | 2.5 |
| Burning Rate (in./min.) | 4.7 | — | — | — | — | — | — |

[a]Values are averages from 4 – 6 samples of urethane foam, formulated as in Table I;
[b]Control — no flame retardant;
[c]Two samples out of 6 burned completely
[d]All samples burned full 5 inches;

EXAMPLES 8-14

Samples of the foams used in Examples 1-7 were subjected to thermal aging at 250° F. for 24 hours prior to testing in the ASTM-D-1692-68 test (Table III). Foam with 65% monomer content flame retardant exhibited better flame retardancy than foam with 90% monomer content flame retardant. Samples with <65% monomer content flame retardant had similar flame retardancy, all significantly better than foams formulated with flame retardant containing greater amounts of monomer.

TABLE III[a]

| | Aged Flexible Foam Tests | | | | | | |
|---|---|---|---|---|---|---|---|
| Examples | 8 | 9 | 10 | 11 | 12 | 13 | 14 |
| Percent monomer in flame retardant | Control[b] | 90 | 65 | 40 | 20 | 10 | 5 |
| ASTM D-1692-68 Test Total Inches Burned | 5[c] | 5[c] | 5[c] | 2.0 | 1.9 | 1.5 | 1.7 |
| Burning Rate (in/min) | 4.0 | 3.7 | 2.6 | — | — | — | — |

[a]Values are averages from 4 samples of urethane foam formulated as in Table I and heat aged at 230° F. for 24 hours prior to testing.
[b]Control — contains no flame retardant
[c]All samples burned full 5 inches FIG. 1 is based upon the data set forth in Table II and presents a curve showing the relationship between the weight percent monomer in the flame retardant mixture of monomer and high boiling phosphonate and the inches burned of the unaged flexible foam. From the curve, it will be noted that good flame retardance is obtained with a flame retardant mixture containing as much as 75 weight percent monomer.

FIG. 2 is based upon the data set forth in Table III and presents a curve showing a similar (to FIG. 1) relationship for the flexible foam after aging. It will be noted from the curve that good flame retardancy is obtained with a flame retardant mixture containing as much as 40 weight percent monomer. At different loadings or with different formulations the maximum monomer content that will afford good flame retardancy will be expected to vary to some extent.

EXAMPLES 15-20

Flexible urethane foams were prepared using a formulation similar to the formulation in Table I, again using 10 parts by weight of flame retardant. The flame retardants used were the 65% monomer content phosphonate product of TCEP rearrangement and the 2% monomer content phosphonate produced by removing monomer from the 65% monomer material. Foams containing the 2% monomeric phosphonate had significantly better flame retardancy after heat aging, as measured by Limiting Oxygen Index Test, ASTM-D-2863 and by the ASTM D-1692-68 test.

TABLE IV

| Example | 15 | 16 | 17 | 18 | 19 | 20 |
|---|---|---|---|---|---|---|
| Monomer Content of Flame Retardant | Control[a] | Control[a] | 65 | 65 | 2 | 2 |
| Prior Heat Aging[b] | No | Yes | No | Yes | No | Yes |
| Weight Loss on Aging (%) | — | 0.8 | — | 4.2 | — | 1.0 |
| LOI[c] | 20.6 | 19.7 | 26.7 | 25.5 | 26.7 | 26.5 |
| ASTM D-1692-68 Test Inches Burned | 5.0[d] | 5.0[d] | 1.3 | 2.1 | 1.3 | 1.4 |

[a]Control — no flame retardant
[b]240° F., 24 hours
[c]Limiting Oxygen Index Test (ASTM D-2863)
[d]Sample burned full 5 inches

EXAMPLES 21-24

Flexible urethane foams were prepared using a formulation similar to that given in Table I, except that the flame retardant level was varied from 0 to 15 parts by weight. The flame retardant was again the 65% monomeric phosphonate product of TCEP rearrangement. Flame retardancy was measured by the LOI Test ASTM D-2863 before and after heat aging at 240° F. for 24 hours and the weight loss on heat aging was measured (Table V). The loss of flame retardance was clearly less than predicted based on the weight loss (Table V and FIG. 3).

TABLE V

| Example | 21 | 22 | 23 | 24 |
|---|---|---|---|---|
| Unaged Foam | | | | |
|   Parts by Weight FR[a] | 0 | 5 | 10 | 15 |
|   Percent FR[a] | 0 | 3.3 | 6.4 | 9.3 |
|   LOI[b] | 20.6 | 24.8 | 26.7 | 27.3 |
| Aged Foam[c] | | | | |
|   Weight Loss, Percent | 0.8 | 2.5 | 4.2 | 5.3 |
|   Net FR Weight Loss[d] | 0 | 1.7 | 3.4 | 4.5 |
|   Net Remaining FR | 0 | 1.6 | 3.0 | 4.8 |
| LOI, Aged Foam[c] | 19.7 | 23.8 | 25.5 | 26.3 |
| LOI, Predicted (A)[e] | 20.6 | (22.8)g | 24.3 | 25.9 |
| LOI, Predicted (B)[f] | 19.7 | (21.9)g | 23.4 | 25.0 |

[a] FR = phosphonate flame retardant.
[b] Limiting Oxygen Index (ASTM D-2863).
[c] aged at 240° C. for 24 hours.
[d] Subtracts weight loss of control.
[e] Predicted from flame retardancy of unaged foam at different FR levels and net remaining FR level.
[f] LOI Predicted (B) = LOI Predicted (A) − 0.9. This 0.9 is the loss in flame retardancy normaly experienced by this foam on aging.
[g] Extrapolated values.

FIG. 3 is based upon the data set forth in Table V and presents curves showing the relationship between the LOI and weight percent of 65% monomer flame retardant mixture initially in flexible urethane. Curve A shows the LOI actually found for the flexible foam after aging. Curve B shows the LOI predicted (B) for a foam having the net amount of flame retardant remaining after aging as compared with the LOI usually experienced with a foam containing that (net) amount of flame retardant in fresh foam, corrected by the loss in flame retardancy experienced with this foam with no flame retardant after aging. It will be apparent from comparing the curves that a greater amount of flame retardancy was experienced than could be expected or predicted.

EXAMPLES 25–29

Rigid polyurethane foams containing the 65% monomeric phosphonate flame retardant mentioned above exhibit surprisingly better flame retardancy than foams formulated with corresponding amounts of the similar material tris (2-chloroethyl) phosphate, as measured by weight loss following corner ignition of 2"×8.5"×½" samples. The samples are placed at a 45° angle relative to the ignition source, an Anderson-Forrester micro burner (Table VI).

TABLE VI[1]

| Examples | 25 | 26 | 27 | 28 | 29 |
|---|---|---|---|---|---|
| Flame Retardant[2] | — | A | A | B | B |
| PBW flame retardant | 0 | 5 | 10 | 5 | 10 |
| % Wt. loss (45° angle test) | 78 | 21 | 12 | 76 | 30 |

[1] 45° angle flame retardancy tests for rigid polyurethane foams
[2] A = 65% monomeric content phosphonate mentioned above
B = tris (2-chloroethyl) phosphate

EXAMPLES 30–43

Samples of flexible polyurethane foam formulated with the 65% monomeric phosphonate mentioned above, likewise exhibit better flame retardancy and retention than similar foams formulated with the similar flame retardent tris (2-chloroethyl) phosphate (Table VII).

TABLE VII[1]

| | | | | | ASTM D-1692-68 | |
|---|---|---|---|---|---|---|
| Example | FR[2] | FR Level | Heat Aged[3] | % Wt. Loss[3] | In. Burned[4] | In./min. Burning Rate |
| 30 | — | — | No | — | 5 | 4.0 |
| 31 | A | 5 | No | — | 5 | 2.5 |
| 32 | A | 10 | No | — | 1.3 | — |
| 33 | A | 15 | No | — | 1.7 | — |
| 34 | B | 5 | No | — | 5 | 3.4 |
| 35 | B | 10 | No | — | 5 | 2.6 |
| 36 | B | 15 | No | — | 2.2 | — |
| 37 | — | — | Yes | 0.8 | 5 | 3.9 |
| 38 | A | 5 | Yes | 2.5 | 5 | 2.4 |
| 39 | A | 10 | Yes | 4.2 | 2.1 | — |
| 40 | A | 15 | Yes | 5.3 | 1.5 | — |
| 41 | B | 5 | Yes | 2.8 | 5 | 3.8 |
| 42 | B | 10 | Yes | 4.8 | 5 | 4.1 |
| 43 | B | 15 | Yes | 8.8 | 5 | 3.4 |

[1] D-1692 testing of flexible polyurethane foams before and after heat aging
[2] A = 65% monomeric phosphonate mentioned previously
B = tris (2-chloroethyl) phosphate
[3] Heat aged at 240° F, 24 hours prior to testing
[4] 5 inches = total sample In the foregoing Examples 25 through 43, the tris (2-chloroethyl) phosphate used has a structure similar to that of the bis (2-chloroethyl) 2-chloroethyl phosphonate. Thus, both could be expected to behave similarly as flame retardants. Surprisingly, the phosphonate was found to be more effective.

EXAMPLES 44–53

The 65% monomeric phosphonate is an effective flame retardant in a broad range of plastic resins as measured by the Limiting Oxygen Index ASTM D-2863 (Table VIII).

TABLE VIII

PERFORMANCE BY LOI[1] TEST

| Example | Polymer | 0.0% | 5.0% | LOI Gain by Weight % Loading Gain | 10.0% | Gain |
|---|---|---|---|---|---|---|
| 44 | Rigid Urethane Foam[2] | 21.7 | 23.3 | 1.6 | 25.0 | 3.3 |
| 45 | Flexible Urethane Foam | 20.0 | 23.6 | 3.6 | 25.3 | 5.3 |
| 46 | Polyethylene Terephthalate | 25.8 | 41.7 | 15.9 | 40.8 | 15.0 |
| 47 | Nylon | 25.0 | 27.5 | 2.5 | 26.7 | 1.7 |
| 48 | Cellulose Acetate | 22.5 | 26.7 | 4.2 | 27.5 | 5.0 |
| 49 | Polystyrene | 20.8 | 22.5 | 1.7 | | |
| 50 | Polypropylene | 18.3 | 22.5 | 4.2 | | |
| 51 | ABS[4] | 20.8 | 21.7 | 0.9 | 22.5 | 1.7 |
| 52 | Polymethyl methacrylate[5] | 20.0 | 20.8 | 0.8 | 22.5 | 2.5 |
| 53 | Unsaturated Polyester[6] | 20.5 | 26.3[3] | 5.8 | | |

[1]Test specimen cross section: .07″ × 5″ (Urethanes: .25″ × .5″) Flame Retardant is 65% monomeric phosphonate described previously.
[2]Typical sucrose polyol, polymeric isocyanate formulation with 2.0 pcf density [3]Value at 15% loading
[4]Borg-Warmer Cyclolac AM Cycolac
[5]DuPont Lucite 147
[6]Sytrene crosslinked unsaturated polyester from maleic anhydride, phthalic anhydride and 1,2-propane diol The flame retardant mixtures of this invention are effective at flame retardant concentration in polymers, including, by way of non-limiting examples, rigid polyurethanes and flexible polyurethane, polyethylene, terephthalate, polycarboxyamide, polyacrylonitrile, acetate rayon, polystyrene and other styrene polymers (e.g., ABS). They will also be effective in combinations with polymeric materials such as cotton, cellulose, paper and silk; cellulose esters and ethers such as cellulose acetate butyrate and ethyl cellulose; polyvinyl chloride; polymethyl methacrylate and other acrylates; nylons; polyolefins such as polyethylene and polypropylene; phenol-aldehyde resins; alkyd resins, urea resins, epoxy resins; linear and cross-linked polyester; and maleic anhydride heteropolymers. Flame retardant concentrations can vary dependent upon the polymer used. In general, they will be 2 to 30 percent, preferably 4 to 16 percent, based upon the weight of the total composition.

The flame retardant mixtures can be incorporated into the polymer during the polymerization step or by admixing with the polymer prior to or during milling, extrusion, spinning, foaming, pressing or other conventional operations for forming or applying the polymeric end-product.

The physical form of the flame retardanted composition can vary widely. While rigid and flexible polyurethane foams are of major interest, fibers, films, coatings, sheets, rods, boards, and the like can be used.

Although the present invention has been described with preferred embodiments, it is to be understood that modifications and variations may be resorted to, without departing from the spirit and scope of this invention as those skilled in the art will readily understand. Such modifications and variations are considered to be within the purview and scope of the appended claims.

What is claimed is:

1. A flame retardant mixture containing between about one weight percent and about 75 weight percent of a monomer compound having the structure:

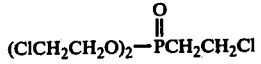

and between about 99 weight percent and about 25 weight percent of a high boiling phosphonate comprising predominantly a compound having the structure:

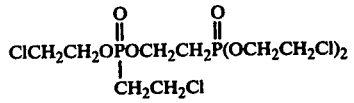

2. The flame retardant mixture of claim 1, wherein the amount of said monomer is between about 2 weight percent and about 65 weight percent and the amount of said high boiling phosphonate is between about 98 weight percent and about 35 weight percent.

3. The flame retardant mixture of claim 1, wherein the amount of said monomer is about 65 weight percent and the amount of said high boiling phosphonate is about 35 weight percent.

4. The flame retardant mixture of claim 1, wherein the amount of said monomer is about 2 weight percent and the amount of said high boiling phosphonate is about 98 weight percent.

5. A polymer composition containing a flame retardant amount of the flame retardant mixture of claim 1.

6. The polymer composition of claim 5, wherein the flame retardant mixture is that defined in claim 2.

7. The flame retardant composition of claim 5, wherein the flame retardant mixture is that defined in claim 3.

8. The polymer composition of claim 5, wherein the flame retardant mixture is that defined in claim 4.

9. The polymer composition of claim 5, wherein the polymer is rigid urethane foam.

10. The polymer composition of claim 7, wherein the polymer is rigid urethane foam.

11. The polymer composition of claim 8, wherein the polymer is rigid urethane foam.

12. The polymer composition of claim 5, wherein the polymer is flexible urethane foam.

13. The polymer composition of claim 7, wherein the polymer is flexible urethane foam.

14. The polymer composition of claim 8, wherein the polymer is flexible urethane foam.

* * * * *